Patented Oct. 30, 1923.

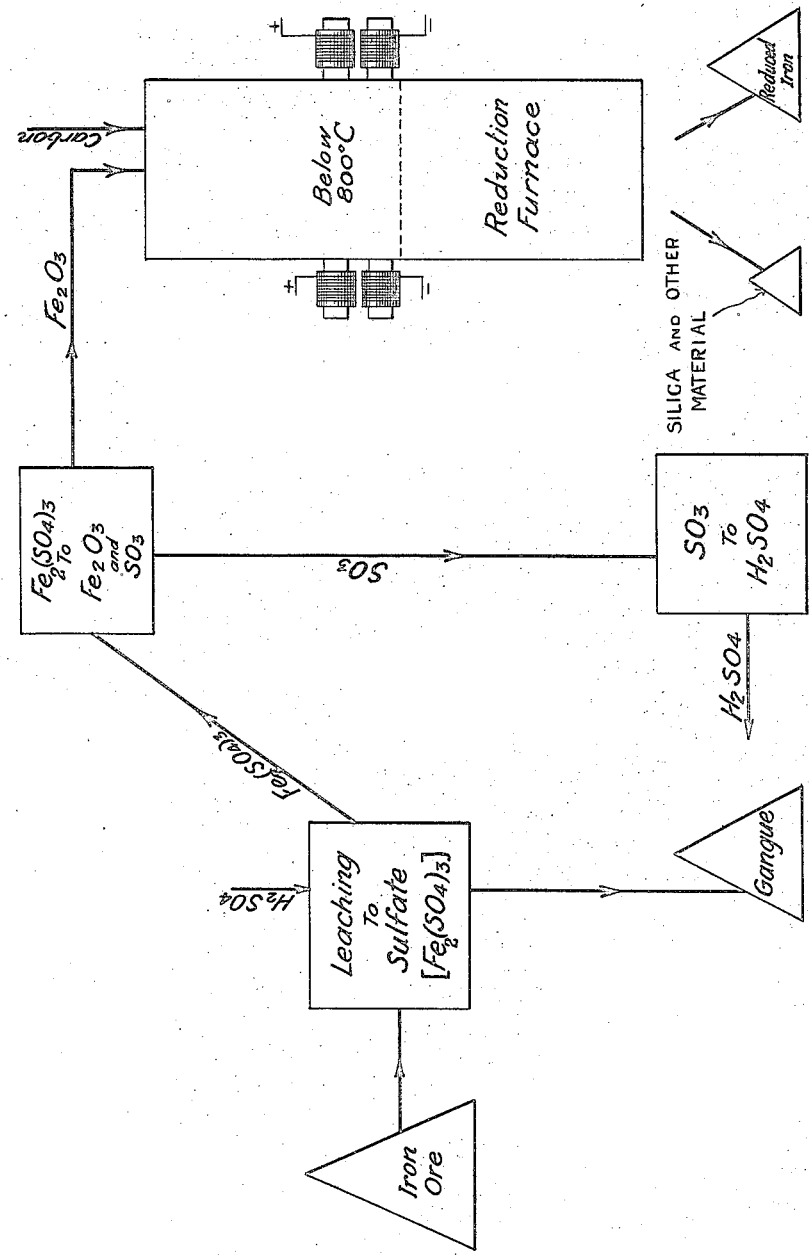

1,472,131

UNITED STATES PATENT OFFICE.

ARTHUR J. MOXHAM, OF NEW YORK, N. Y.

PROCESS OF OBTAINING PURIFIED IRON FROM ITS ORES.

Application filed August 21, 1919. Serial No. 318,851.

*To all whom it may concern:*

Be it known that I, ARTHUR J. MOXHAM, a subject of the King of Great Britain, residing at New York city, county of New York, and State of New York, have invented a new and useful Improvement in Processes of Obtaining Purified Iron from Its Ores, of which the following is a full, clear, and exact description.

The leaching of iron ores with acids or other solvents for the purpose of separating the metallic ingredients from the silica and other ingredients has recently been developed.

As an example, limonite iron ore may be treated with sulfuric acid of a specific gravity of 1.33 at a boil, say at a temperature of about 127° C. or slightly over. The leaching operation may be accompanied by agitation and a current of acid may be kept moving through the mass. The ferric sulfate precipitate that results may be recovered from the gangue by allowing the acid current that has washed the ferric sulfate off the residue to overflow into a settling tank and winning back any acid that remains adhering to the ore, by the subsequent heat treatment; or the ferric sulfate may be dissolved in water and the solution drained off the gangue; or the dilute hot liquid, which contains the ferric sulfate in solution, may be drained off the gangue and, by cooling, the ferric sulfate may be allowed to separate. These examples are merely illustrative of the leaching step. My invention does not involve the use of any particular acid or other solvent. Other examples of separation by a solvent acid may be found in applications heretofore filed by me.

After the silica and allied ingredients not acted on by the solvent are effectively separated from the iron, the latter, which is in the form (say) of ferric sulfate, may be subjected to heat. During such heat treatment, the solvent agent (in this case the gaseous $SO_3$) will be driven off and be recovered for further use, and the iron is converted into ferric oxide. It is then (in the presence of some form of carbon) by further heat treatment converted into magnetic oxide and so into ferrous oxide, until finally the completely reduced iron is the result.

As soon as the magnetic stage is reached, I find that an effective separation can be effected by the use of magnets, which may be applied to the outside shell of the furnace used for reducing the ore. The iron at this stage responds readily to magnetic action, as it is in a finely powdered or pulverized form. The furnace may be of many forms, although a properly designed furnace of the well known McDougall or Herreshoff type has many advantages. The magnetic material is drawn by the magnets to the outside zone of the furnace, away from the non-magnetic material. In this separation, the plows or feeder arms, which keep the material on its proper path and which also keep it agitated, can be made to aid by so directing such material that it is fed away from the pull of the magnetism.

In treating the material which has now been converted by reduction and heat from the form of ferric oxide $Fe_2O_3$ to that of magnetic oxide $Fe_3O_4$, it should be remembered that the material will lose its magnetism if the critical temperature approximating 800° C. is reached. Hence the magnetic treatment should be applied after the iron compound has been converted into ferric oxide and from that to magnetic oxide, but before the critical temperature is reached. After the $SO_3$ has been driven off, and the iron converted from a sulphate into an oxide, if the heat retained when the oxide is subjected to the action of the carbon in conjunction with the heat, is of a temperature near the critical temperature, it is manifest that the heat must be kept down below this critical temperature until after the magnetic separation has been finished. It is quite feasible to regulate the amount of time that the magnetic oxide, or the reduced iron, is subjected to the magnetism while the process of reduction is going on, either by holding the temperature down below the critical temperature until the magnetism has done its work, or by letting the material cool and then reheating it. In the latter case it will take longer to reach the critical temperature than if it is not cooled off. In dealing with ferric oxide, the conversion into magnetic oxide commences at a temperature a little above 260° centigrade and is finished, the proper time being allowed, at a temperature of about 585° centigrade, so that all that is necessary is to hold the material, after it has reached the magnetic oxide stage, below the critical temperature of 850° centigrade or thereabouts long enough to effect a complete separation. The material thus separated leaves the furnace with the magnetic iron in one stream and the non-magnetic material in another, as is generally the case in magnetic separation.

The ingredients that generally accompany ordinary iron ore are not as greatly responsive to the magnetism as is the iron. The method is extremely effective when dealing with the phosphoric ingredients, and also with sulphur if in the form of a sulphate, as is the case when sulfuric acid is used as the solvent.

If for any reason any ferric sulfate remains in the ferric oxide after it reaches the separating zone this remaining ferric sulphate can be separated from the iron in the magnetic treatment, as ferric sulphate is not easily responsive to magnetism, and it can be subsequently separated from the remaining gangue by being dissolved in water.

Magnetic separation can be applied while the material is either hot or cold though I preferably apply the method while the material is hot and going through the process, as this leads to economy, and the heat in no way affects the magnetic separation if this is properly conducted. It may sometimes be necessary however to subject the material to magnetic action while cold.

By this means the iron is finally won in a condition of great purity and there remain only mere traces of the other ingredients. The method also leads to the following advantages:

The gangue of all iron ores consists very largely of silica. Taking, for example, the ordinary limonite ore, it will contain, the following ingredients for each 100 units of iron:

| | Units. |
|---|---|
| Silica | 50 to 60 |
| Alumina | 4 to 7 |
| Manganese | 2 to 4 |
| Zinc | ½ to 2 |
| Other ingredients | 1 to 3 |

Having, by leaching, secured the iron in separate form, it is feasible to easily separate the great bulk of the gangue from this iron salt by jigging or similar devices, such as the ordinary tables, or classifiers. This separation is thoroughly effected because the silica is in pure condition and does not have the iron oxide that adheres when it has been subjected to crushing only, as is the case in ordinary separating methods. Its physical condition, therefore, is more clearly distinct and different from that of the other ingredients and being more uniform it is easily separated.

The more or less valuable ingredients such, for example, as alumina, manganese and zinc enumerated above as contained in the gangue may be recovered in accordance with certain improvements which I have made but the present application is more particularly directed to the treatment of the ore and the recovery and separation of the iron therefrom.

The drawing accompanying this application is a diagram of the several steps of the process showing the successive stages in the treatment of the iron containing material and the recovery of the iron.

I am aware that magnetic separation per se is not new; but it is new to apply it while the material is going through a heat zone; and it is also new to prepare the material for magnetic separation by first converting the material to a finely divided physical condition thoroughly separated from the other ingredients, preferably by a leaching process of the character described, and then effecting the magnetic separation, whether the material be hot or cold.

Having now fully described my invention, what I claim and desire to protect by Letters Patent is—

1. The process of treating iron ore to obtain purified iron and material containing a high content of the other metallic ingredients of the ore, which comprises leaching the ore with a solvent adapted to combine with the iron, separating the resultant iron compound from the silicious gangue, subjecting said iron compound to heat to drive off the solvent and to form oxides and to heat in the presence of carbon to convert it to the magnetic condition by reduction of the oxides and applying magnetism during said reducing heat treatment to separate the iron and treating the remaining gangue to separate it from any other metallic ingredients.

2. The process of treating iron ore, which comprises leaching the ore with a solvent adapted to combine with the iron, separating the resultant iron compound from the silicious material, subjecting said iron compound to a heat treatment to drive off the solvent agent and to a heat treatment in the presence of carbon to reduce the iron compound formed to the magnetic condition and while said iron is in the magnetic condition, applying magnetic force to separate the iron from the non-magnetic material.

3. The process of treating iron ore, which comprises leaching the ore with a reagent adapted to combine with the iron, subjecting the resultant iron compound to heat to drive off the reagent and form ferric oxide in a pulverulent condition, and subjecting the said ferric oxide to further heat in the presence of some form of carbon, and when it reaches the magnetic condition separating the magnetic material from the non-magnetic material.

4. The process of treating iron ore, which comprises separating the iron from the ore in a magnetic and pulverulent condition and subjecting the magnetic material while in a heated condition to magnetic force to separate it from the non-magnetic material.

5. The process of treating iron ore, which comprises leaching the ore with a reagent adapted to combine with the iron, but adapted to be driven off therefrom by heat to convert the resultant iron compound into an iron oxide, subjecting the resultant iron compound first to heat to drive off the reagent and then to heat in the presence of carbon to reduce the iron oxide to a magnetic condition, and subjecting said magnetic material to magnetic force to separate the same from the non-magnetic material.

6. The process of treating iron ore, which comprises a treatment by which the silicious material of the ore is separated from the iron and the iron obtained in the form of a ferric oxide, subjecting the ferric oxide to heat in the presence of some form of carbon to reduce it to a magnetic condition, and during the reducing process applying magnetic force to separate the magnetic material from the non-magnetic material while holding the temperature of reduction below the point at which magnetic action of the iron while hot ceases until the separation is substantially complete.

7. The process of treating iron ore, which comprises a treatment by which the silicious material of the ore is separated from the iron and the iron obtained in the form of a ferric oxide, subjecting the ferric oxide to heat in the presence of some form of carbon to reduce it to a magnetic condition, and before the material has reached, in the reducing operation, a temperature at which it substantially loses its magnetic condition, applying magnetic force to separate the magnetic material from the non-magnetic material.

In testimony of which invention, I have hereunto set my hand, at New York city, on this 12th day of August, 1919.

ARTHUR J. MOXHAM.